July 27, 1943.  J. P. WOODS  2,325,199
METHOD AND APPARATUS FOR SEISMIC EXPLORATION
Filed June 30, 1941
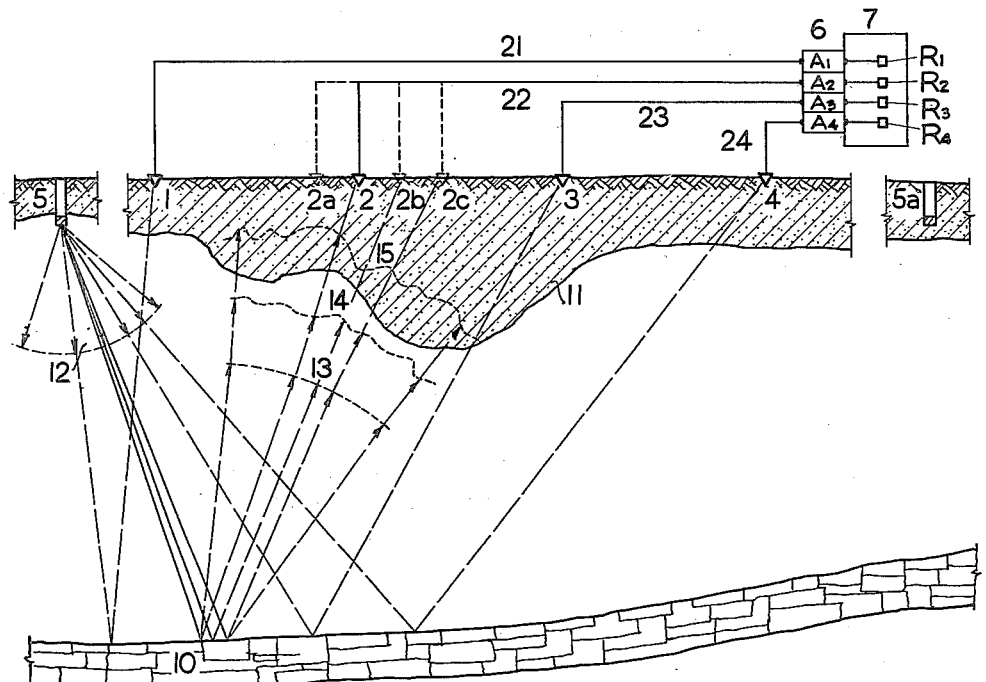
Fig. 1
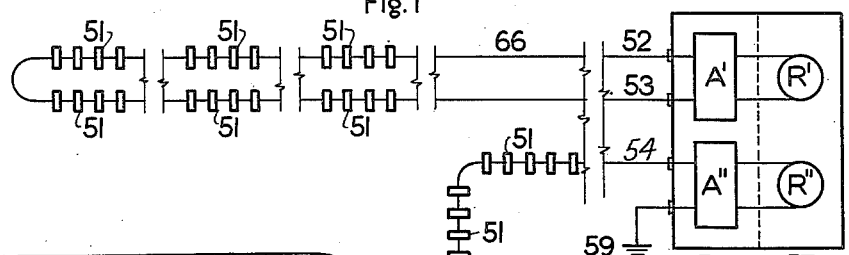
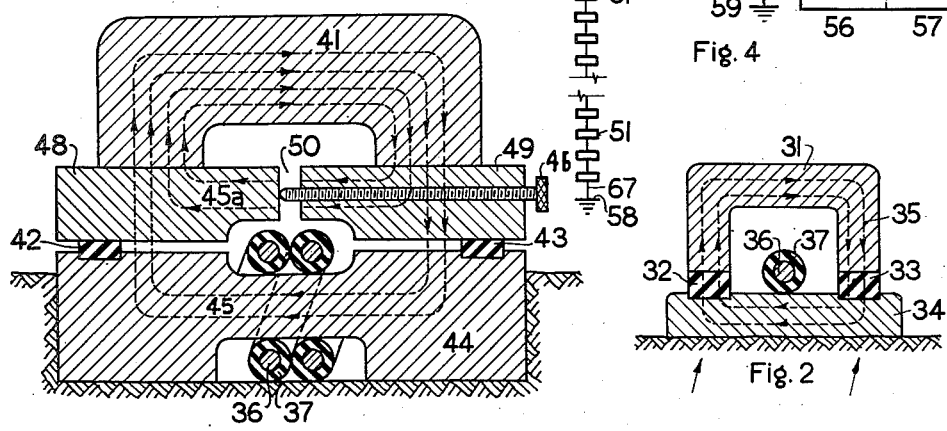
Fig. 4
Fig. 3
Fig. 2
Inventor: John P. Woods
By his Attorney:

Patented July 27, 1943

2,325,199

UNITED STATES PATENT OFFICE 2,325,199

METHOD AND APPARATUS FOR SEISMIC EXPLORATION

John P. Woods, Houston, Tex., assignor to Shell Development Company, San Francisco, Calif., a corporation of Delaware Application June 30, 1941, Serial No. 400,547

9 Claims. (Cl. 177—352)

This invention pertains to the art of seismic exploration, and relates more specifically to a method and apparatus for seismologically mapping geological structures while averaging out and minimizing the errors due to the effect of haphazard or random irregularities of the ground on the performance of the surveying apparatus.

The objects achieved by the present invention, as well as the characteristic features thereof are pointed out in detail in the following description taken with reference to the attached drawing, wherein:

Fig. 1 is a diagrammatic view showing a section of the earth's crust and selected paths of seismic waves to and from geological layers;

Figs. 2 and 3 are diagrammatic cross-section views of the seismic detectors used according to the present invention; and Fig. 4 is a diagram indicating in plan view the manner in which detectors may be arranged on the ground according to the present invention.

Seismic methods are concerned with the measurement of the time intervals between the moment wherein a disturbance is created in the ground, for example, by means of an explosion, and the moments wherein the seismic waves generated by said explosion arrive at each of a plurality of instruments, such as seismometers or seismic detectors, located at predetermined distances from the explosion or shot point and from each other. The detectors translate the mechanical energy of the seismic waves into electrical impulses, which are then transmitted to a galvanometer or recorder capable of registering or photographically recording said impulses. Suitable amplifiers are usually interposed between a detector and its recording element.

Seismic reflection methods, and particularly so-called dip shooting and continuous profiling methods, constitute a most efficient tool for accurately surveying vast tracts of land with regard to the character of their subsurface stratification.

Referring more particularly to the drawing, Fig. 1 diagrammatically shows a method of effecting a seismic continuous profiling survey.

The detonation of an explosive charge at shotpoint 5 generates seismic waves, some components of which are reflected by sub-surface geological formations such as a reflecting layer shown at 10. The reflected waves, along with other waves, are received at the various detectors 1, 2, 3 and 4, which may be given a straight line, or any other desired arrangement, and are thereby converted into electrical impulses which are transmitted, by means of suitable conductors 21—24, to an amplifying device 6 having proper amplification circuits or elements $A_1$—$A_4$, and a recording device 7, such as a recording multi-string galvanometer or oscillograph having strings or recording elements $R_1$—$R_4$, each detector, transmitting line or cable, amplifying element, and recording element forming one so-called seismograph channel.

A second shot may then be fired at a point 5a, which may be, for example, symmetrical with point 5 in relation to the detectors 1—4, whereafter said detectors may be moved along the line 1—4 to new points located at a desired distance to the right of their former position. By repeating this procedure a desired number of times, a tract of any desired length may be completely profiled.

The elastic seismic waves generated by a ground disturbance are propagated in all directions from the point of origin along straight lines, forming a continuous travelling wave front. For practical purposes, small portions of this wave front may be considered spherical, as shown at 12 or at 13.

Since, however, the reflecting layer is quite often positioned at a considerable depth, the travelling spherical wave front becomes gradually somewhat distorted, as shown at 14, due, for example, to passage through non-reflecting or partially-reflecting layer interfaces, or to various inhomogeneities existing even in uniform ground.

This distortion becomes especially pronounced, as shown at 15, when the reflected wave front enters the so-called weathered layer, both the depth and the wave-propagation velocity of said layer being often subject to considerable variations even over relatively small areas, said velocity usually varying from that of the underlying formations by a factor of three or more.

It is, therefore, apparent that the exact moment of arrival of the wave at the detector of a particular channel depends to a considerable extent on the location of the exact point at which the operator had elected to place said detector.

In other words, the time of arrival of the wave front at the detector 2, when said detector is placed at point 2a, is somewhat different from that at which said wave would have reached said detector, had the operator chanced to place said detector at point 2c, although the distance between said two points may be only a few feet.

It is also apparent that the accuracy of any calculations of the depth, dip, etc., of the reflecting layer 10, based, for example, on the difference in time arrival of the reflected wave at the detectors 2 and 3, respectively, is affected by unpredictable effects attendant the selection of the particular point for the location of each of said detectors and the particular deformation undergone by the seismic wave in each particular case.

It may be further noted that besides errors introduced by the distortion of the wave front, the indications of the detectors are subject to individual errors due to the nature and configuration, or the elastic and vibration characteristics of the particles of ground in which the detectors are imbedded, and to the nature of the bond, which may be stronger or weaker, formed between the detectors and the ground. Thus, certain particles of ground are subject to a vertical displacement or motion as a result of the arrival of the seismic waves, while some other particles in the immediate neighborhood may be caused to vibrate in a transverse direction by the same waves. Since the seismometers in general do not react in like manner to vertical and transverse displacement, another unpredictable source of error is thus introduced into the data or records by the mere fact of selecting each particular emplacement for each detector.

Since the above errors are due to entirely haphazard or random factors, not susceptible of any control by the operator, no correction factor can be introduced into the calculations to discount their effect.

Various methods, such as the placement of the detectors below the weathered layer, or the use of a plurality of detectors, in series or in parallel, in each seismograph channel to average out their errors, have therefore been proposed to solve the above problems.

The placement of the detectors below the weathered layer is, however, subject to many difficulties due, for example, to the fact that said layer often extends to considerable depths.

The scheme of using a plurality of detectors in each seismograph channel has not been carried out in practice to an extent greater than the use of about 16 detectors per channel. A commonly used arrangement consists of 4 detectors per channel, for example, as shown with regard to the channel of detector 2 in Fig. 1. Since the shot point is usually located at a distance of from 50 to 2000 feet from the nearest channel detector, and successive channel detectors are placed at distances from 25 to 300 feet from each other, four detectors per channel are not sufficient to give a good average for varying terrain conditions in the zone covered by each channel in effecting an accurate continuous profiling survey.

The reasons which have hitherto prevented the use of a larger number of detectors per channel are as follows:

First, a detector such as commonly used in seismic exploration, is a relatively expensive apparatus encased in a protective housing and costing about $150. Since 8, 16 or 32 channels are commonly used in combination with a multi-string recorder, the use of even 4 detectors per channel results in an investment of over $16,000 merely in detectors, and a further increase of the number of detectors becomes therefore prohibitive, especially in view of the fact that the improvement of accuracy attendant an increase of the number of detectors varies only as the square root of said number. To give an improvement factor of three, the number of detectors must therefore be multiplied by nine, and an improvement factor of ten is given only by a hundred-fold increase in the number of detectors.

Second, the internal mechanism of a conventional detector is fairly complicated and delicate, and requires careful adjustment. Especially complex is the problem of the electrical connections between the detector and the amplifying and recording apparatus, which are usually carried in an exploration truck. In view of storage and transportation difficulties, and in view of the fact that the distance between a particular detector and the recording truck may vary at each station, it is not expedient to manufacture detectors having permanently attached thereto a continuous insulated cable connecting the detector to the truck. It is therefore customary to provide each detector with some sort of terminals whereby the field coil of the detector can be electrically connected by plugs or clips to insulated cables of interchangeable lengths leading to the recording apparatus. These electrical connections are a source of grave trouble, and require constant checking, in view of the constant breakdowns, short-circuits and other difficulties which occur at these points, especially when operating in rugged, marshy or partially submerged terrain. It is obvious that if a large number of detectors were used in each of the channels of a 16-channel seismograph apparatus, the necessity of checking the electrical connections between each detector on the channel cables would occupy the time of the surveying crew practically to the exclusion of any other activity.

It is, therefore, an object of this invention to provide a method of seismic exploration wherein the individual errors in the responses of the detectors due to irregularities in the wave front arriving at said detectors, or to peculiarities of the ground in contact with said detectors are averaged out and minimized by the use of a large number of detectors connected to each recording element or in each channel.

It is also an object of this invention to provide for this purpose a detector of sufficiently simple and cheap construction to permit a large number of such detectors to be used in each channel without prohibitively increasing investment costs.

It is also an object of this invention to provide a detector of simple and rugged construction, which does not require any time-consuming adjustments or checks by the operating crew.

It is also an object of this invention to provide a detector of simple construction which does not require electrical connection to the insulated channel cables by means such as plugs or clips, whereby the main source of electrical breakdowns in the circuits used is eliminated.

It is also an object of this invention to provide a detector connected to the channel cable solely by magnetic linkage, whereby the necessity of electrical connection between the detector and the cable and the difficulties attendant thereto are eliminated.

It is also an object of this invention to provide a detector consisting essentially of a magnetic circuit, the field coil of said detector being formed by the channel cable itself.

Fig. 2 shows diagrammatically the simplest embodiment of the present detector comprising essentially an arcuate magnetic body, made of magnetic steel, or of a magnetized alloy such, for example, as that known to the trade as "Alnico" (an alloy of steel with aluminum, nickel and cobalt), having high retentive magnetic properties. The magnet 31 is yieldably supported on resilient or elastic members shown at 32 and 33, such, for example, as soft rubber discs or washers. The discs may simply rest on a soft iron member 34, or may be affixed thereto, for example, by partially inserting them in bores countersunk in the member 34 as shown in Fig. 2. The member 34, which is placed directly on the ground, serves as armature for the magnet 31, the magnetic flux flowing in a circuit indicated by the dotted lines 35, having magnetic gaps at 32 and 33.

The channel conductor cable 36, encased in an insulating protective sheath 37, is inserted within the magnetic circuit 31—32—33—34, and forms the field coil of the detector. When the seismic waves arrive through the ground in a direction such as shown by the arrows in Fig. 2, the member 34 moves together with the ground, while the member 31, which may have a considerable weight, tends to remain stationary due to its inertia. Due to the relative motion of the members 31 and 34 with regard to each other, compressive forces are applied to the resilient members 32 and 33, and the resulting variation in the gaps of the magnetic circuit causes corresponding variations in its reluctance, whereby the cable 36 is cut by varying lines of magnetic force, and electromotive forces or impulses are generated therein.

Another and preferred embodiment of the present detector is shown in Fig. 3, and comprises a magnet 41, an armature 44 and resilient means 42 and 43 therebetween. The magnet 41 is provided at its extremities with thickened portions or flange pieces 48 and 49, which may be either integral therewith, or detachable and form therebetween an additional transverse gap indicated at 50, whereby the magnetic flux is caused to divide into two separate paths, as shown at 45 and 45a. The amount of the flux along path 45a may be controlled by adjusting the length of the gap 50, which may be done by displacing the end members 48 and 49 with regard to each other, preferably in a direction transverse to the main magnetic axis of the magnet, by means of one or more screws 46 passing through either or both of the flanges and made of a non-magnetic material. Control of the gap length may also be effected by means of non-magnetic wedges of varying thickness inserted into said gap, or by any other suitable means.

The cable 36 may be placed within the magnetic circuit 41—44, but outside of the circuit 41—48—50—49 in the same manner as in Fig. 2, or, if it is desired to increase the number of coils cut by the lines of force, may be passed two or more times around the armature 44, as shown in Fig. 3, suitable grooves being provided in the armature and, if desired, in the magnet to give a proper contact with the ground and a suitable gap length, as shown in Fig. 3.

When the detector vibrates under the effect of seismic waves, the variations in the length and reluctance of the gaps at 42 and 43 cause variations in the relative amounts of flux flowing along paths 45 and 45a, respectively, whereby lines of force are made to cut the cable 36 and electromotive forces are generated therein.

In practicing the present invention, a procedure which may be followed in the field for disposing the detectors 51 is described with regard to the two-channel amplifying and recording apparatus shown at 56 and 57, respectively, in Fig. 4, it being, however, understood that any number of seismograph channels may be used.

A continuous insulated conductor cable is stretched out on the ground to give any desired arrangement of detectors, for example, a straight line arrangement as shown with regard to cable 66, which forms a loop with both ends electrically connected to the terminals 52 and 53 of the first channel comprising the amplifying circuit A' and the recording element R'. The cable may also be arranged in folds to give any desired concentration of detectors at any particular location, or may be given any other desired arrangement required by the particular seismic problem to be solved, for example, a right-angle arrangement as shown with regard to cable 67. Instead of having both ends electrically connected to the terminals of the amplifying and recording apparatus to form a given channel, only one end of the cable may be connected to a terminal, as shown at 54, the other end of the cable, and the other terminal of the channel being grounded, as shown at 58 and 59, respectively.

The detectors are magnetically linked with the cable merely by lifting the cable, placing the armature of the detector under the cable (or, if several turns of the cable are desired, by twisting the cable a required number of times around the armature), and placing the magnet in position on the armature and over the cable. In order to insure a better contact between the soil and the detector, it may be desirable to tamp the ground before placing the armature thereon, or to make a small excavation with a suitable tool, and to place the detector therein with suitable tamping.

It will be appreciated that since the coil of the present detector is formed with one or with a few turns of the cable, whereas the coil of conventional detectors has a relatively large number of turns, such as 500, the electrical impulses generated by the present detector will be considerably weaker than those of the conventional detectors. Since, however, the cheapness, light weight and ease of installation permit a large number, such as 40, 100 or more of the present detectors to be used in each channel, the combined impulses generated by these detectors have an intensity fully satisfactory, after suitable amplification, for recording purposes.

It will, therefore, be seen that the present invention has provided for the averaging out and elimination of localized wave-front and ground effects on individual detectors, a method involving the use of a large number of detectors of extremely simple and rugged construction, which require no protective housing, have no complicated or delicate mechanical parts, and are connected to the insulated cables leading to the amplifying and recording apparatus solely by magnetic linkage, whereby the necessity of electrical connections between said detectors and said cables is eliminated.

I claim as my invention:

1. For use in seismic exploration, a closed path magnetic structure comprising two members, one of said members being a magnet and the other an armature therefor, resilient means for supporting one of said members with regard to the other, one of said members being adapted to be laid loosely in contact with the ground to be subject to the vibrations thereof, and the other member being resiliently supported by said means to operate as an inertia element with respect to the vibratory member, one of said members having two legs and the other member being positioned by said resilient means to bridge said legs to form a variable non-magnetic gap in the closed magnetic circuit comprising said members, whereby said magnetic structure is subjected to variation of magnetic flux upon vibration of the vibratory member.

2. For use in seismic exploration, a closed path magnetic structure comprising an arcuate magnet member, an armature member adapted to bridge the magnet member, resilient means adapted to support one of said members with regard to the other member and to maintain a variable non-magnetic gap therebetween, one of said members being adapted to be laid in contact with the ground subject to the vibrations thereof, and the other member being adapted to operate as an inertia element with regard to the vibratory member, whereby the non-magnetic gap and the magnetic flux through the closed magnetic circuit formed by said members are caused to vary as a function of said vibrations.

3. For use in combination with a seismic recorder and an insulated cable electrically connected to said recorder, a seismic detector comprising an arcuate magnet member, an armature member adapted to bridge the magnet member, resilient means adapted to support one of said members with regard to the other end to maintain a variable non-magnetic gap therebetween, one of said members being adapted to be laid in contact with the ground subject to the vibrations thereof, the other member being supported by said resilient means as an inertia element with regard to the vibratory member, the coil of said detector being formed of an integral part of said insulated cable inserted within the magnetic circuit comprising said members.

4. For use in combination with a seismic recorder and an insulated cable electrically connected to said recorder, a seismic detector comprising an arcuate magnet member and an armature member adapted to bridge the magnet member, one of said members being adapted to be laid in contact with the ground subject to the vibrations thereof, resilient non-magnetic means interposed between said vibratory member and the other member adapted to support said other member with regard to the vibratory member and to maintain a variable non-magnetic gap between said members, whereby the supported member forms an inertia element with regard to the vibratory member, and a coil for said detector formed of an integral part of said insulated cable inserted within the magnetic circuit comprising said members.

5. For use in combination with a seismic recorder and an insulated cable electrically connected to said recorder, a seismic detector comprising an arcuate magnet member having thickened end portions forming a non-magnetic gap therebetween, an armature member adapted to bridge the magnet member, resilient means adapted to support one of said members with regard to the other and to maintain therebetween a variable non-magnetic gap transverse to said first gap, whereby the total magnetic flux through said magnet member is caused to divide into two magnetic circuits, one of said circuits comprising the gap between said thickened portions of the magnet member, and the other circuit comprising the gap between said magnet and said armature members, one of said members being adapted to be laid in contact with the ground subject to the vibrations thereof, and the other member being supported by said resilient means as an inertia element with regard to the vibratory member, the coil of said detector being formed of an integral part of said insulated cable removably insertable within the second, but outside of the first of said magnetic circuits.

6. For use in combination with a seismic recorder and an insulated cable electrically connected to said recorder, a seismic detector comprising an arcuate magnet member having movable end extensions of magnetic material forming a non-magnetic gap therebetween, means to adjust said gap by displacing said extensions with regard to each other an armature member adapted to bridge the magnet member, resilient means adapted to support one of said members with regard to the other and to maintain therebetween a variable non-magnetic gap transverse to said first gap, whereby the total magnetic flux through said magnet member is caused to divide into two magnetic circuits, one of said circuits comprising the gap between said movable extensions of the magnet member, and the other circuit comprising the gap between said magnet and said armature members, one of said members being adapted to be laid in contact with the ground subject to the vibrations thereof, and the other member being supported by said resilient means as an inertia element with regard to the vibratory member, the coil of said detector being formed of an integral part of said insulated cable removably insertable within the second, but outside of the first of said magnetic circuits.

7. For use in combination with a seismic recorder and an insulated cable electrically connected with said recorder, a detector comprising a magnetic structure element and a coil element, said magnetic structure element comprising an arcuate magnet member, a first armature member adapted to bridge said magnet member, a second armature member spaced from said first armature member and adapted to bridge said magnet member in parallel therewith, adjusting means for maintaining a predetermined magnetic gap in the magnetic circuit comprising said magnet member and one of said armature members, resilient means for maintaining a variable non-magnetic gap in the magnetic circuit comprising said magnet member and the other armature member, one of said members being adapted to be placed in contact with the ground subject to the vibrations thereof and the other two members being supported as an inertia element with regard thereto by said resilient means, and said coil element consisting of an integral part of said insulated conductor cable inserted within said magnetic structure element between said two parallel armature members.

8. In a seismic exploration system, a recorder an insulated cable electrically connected thereto, and a plurality of magnetic type detectors, the coil of each of said detectors being formed of an integral part of said insulated cable.

9. In a seismic exploration system, a recorder, an insulated cable electrically connected thereto, and a plurality of detectors in contact with the ground, each of said detectors comprising a closed magnetic circuit element having a variable reluctance responsive to ground vibrations, and a coil element formed of an integral part of said cable inserted within said closed magnetic circuit.

JOHN P. WOODS.